US012632853B2

(12) United States Patent　　(10) Patent No.:　US 12,632,853 B2
　　　Mutha　　　　　　　　　　　　(45) **Date of Patent:　　*May 19, 2026**

(54) PAYMENT AUTHENTICATION SYSTEM FOR ELECTRONIC COMMERCE TRANSACTIONS

(71) Applicant: Aurus, Inc., Boston, MA (US)

(72) Inventor: Rahul Mutha, Norwood, MA (US)

(73) Assignee: Aurus, Inc.

( * ) Notice: Subject to any disclaimer, the term of this patent is extended or adjusted under 35 U.S.C. 154(b) by 0 days.

This patent is subject to a terminal disclaimer.

(21) Appl. No.: 18/615,853

(22) Filed: Mar. 25, 2024

(65) Prior Publication Data

US 2024/0232868 A1　　Jul. 11, 2024

Related U.S. Application Data

(63) Continuation of application No. 16/510,593, filed on Jul. 12, 2019, now Pat. No. 11,941,616.

(51) Int. Cl.
G06Q 20/38　　　(2012.01)
G06Q 20/40　　　(2012.01)
(Continued)

(52) U.S. Cl.
CPC ... G06Q 20/38215 (2013.01); G06Q 20/4014 (2013.01); H04L 9/3228 (2013.01); H04L 63/0421 (2013.01)

(58) Field of Classification Search
None
See application file for complete search history.

(56) References Cited

U.S. PATENT DOCUMENTS 11,983,788 B2 *　5/2024　Dharmar ................ G06Q 50/34
2013/0060657 A1　3/2013　Kudva et al.
(Continued)

FOREIGN PATENT DOCUMENTS

WO　　WO-2018002620 A1 *　1/2018　.............. H04L 9/32

OTHER PUBLICATIONS

Solat, S., "Security of Electronic Payment Systems: A Comprehensive Survey", ARXIV ID: 1701.04556, Publication Date: Jan. 17, 2017. (Year: 2017).*
(Continued)

*Primary Examiner* — Clay C Lee
(74) *Attorney, Agent, or Firm* — Foley & Lardner LLP

(57)　　　　　　ABSTRACT

A payment managing system and method for enhancing the security of electronic user payment data can include employing a two factor authentication and keeping e-commerce host system outside the PCI scope. The two-factor authentication can include using a session ID and a one-time token (OTT). The session ID can identify a payment session that is initiated upon initiation of an e-commerce transaction. The payment managing system can provide a computing device initiating the transaction an iFrame to handle input user input data on an information resource. The OTT can be used to tokenize the user input data. The OTT can be included in payment authorization requests sent to the payment managing system. The payment managing system can obtain payment authorization without the user payment data being shared with e-commerce host systems.

20 Claims, 7 Drawing Sheets

(51) Int. Cl.
    *H04L 9/32*         (2006.01)
    *H04L 9/40*         (2022.01)

(56)            References Cited

U.S. PATENT DOCUMENTS

| | | | |
|---|---|---|---|
| 2013/0117185 A1* | 5/2013 | Collison | G06Q 20/3829 |
| | | | 705/67 |
| 2018/0349891 A1 | 12/2018 | Putre et al. | |
| 2019/0043022 A1 | 2/2019 | Fosmark et al. | |
| 2020/0097956 A1* | 3/2020 | Sharma | G06Q 20/085 |

OTHER PUBLICATIONS

Final Office Action on U.S. Appl. No. 16/510,593 Dated Nov. 4, 2022.

Final Office Action on U.S. Appl. No. 16/510,593 Dated Dec. 7, 2021.

Final Office Action on U.S. Appl. No. 16/933,353 Dated Mar. 19, 2021.

Final Office Action on U.S. Appl. No. 16/933,353 Dated Mar. 23, 2022.

Final Office Action on U.S. Appl. No. 16/933,353 Dated Mar. 27, 2023.

Non-Final Office Action on U.S. Appl. No. 16/510,593 Dated May 14, 2021.

Non-Final Office Action on U.S. Appl. No. 16/510,593 Dated May 25, 2023.

Non-Final Office Action on U.S. Appl. No. 16/510,593 Dated Jun. 23, 2022.

Non-Final Office Action on U.S. Appl. No. 16/933,353 Dated Oct. 24, 2022.

Non-Final Office Action on U.S. Appl. No. 16/933,353 Dated Nov. 9, 2020.

Notice of Allowance on U.S. Appl. No. 16/510,593 Dated Nov. 21, 2023.

Notice of Allowance on U.S. Appl. No. 16/933,353 Dated Aug. 21, 2023.

US Office Action on U.S. Appl. No. 16/933,353 Dated Nov. 15, 2021.

\* cited by examiner

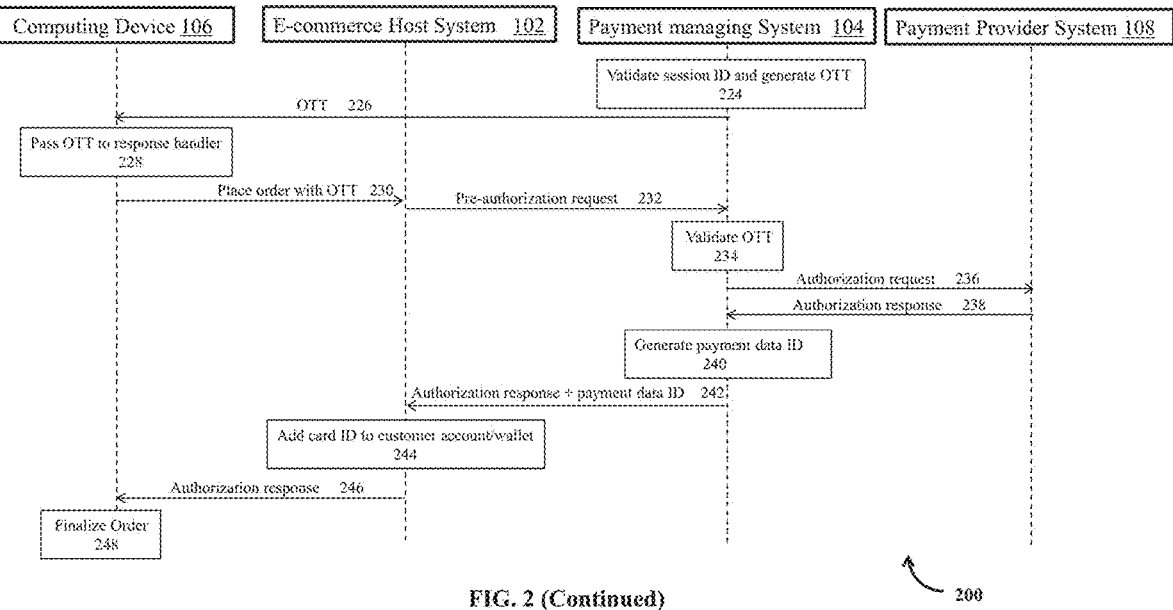

| Computing Device 106 | E-commerce Host System 102 | Payment managing System 104 | Payment Provider System 108 |
|---|---|---|---|

Validate session ID and generate OTT
224

OTT     226

Pass OTT to response handler
228

Place order with OTT     230

Pre-authorization request     232

Validate OTT
234

Authorization request     236

Authorization response     238

Generate payment data ID
240

Authorization response + payment data ID     242

Add card ID to customer account/wallet
244

Authorization response     246

Finalize Order
248

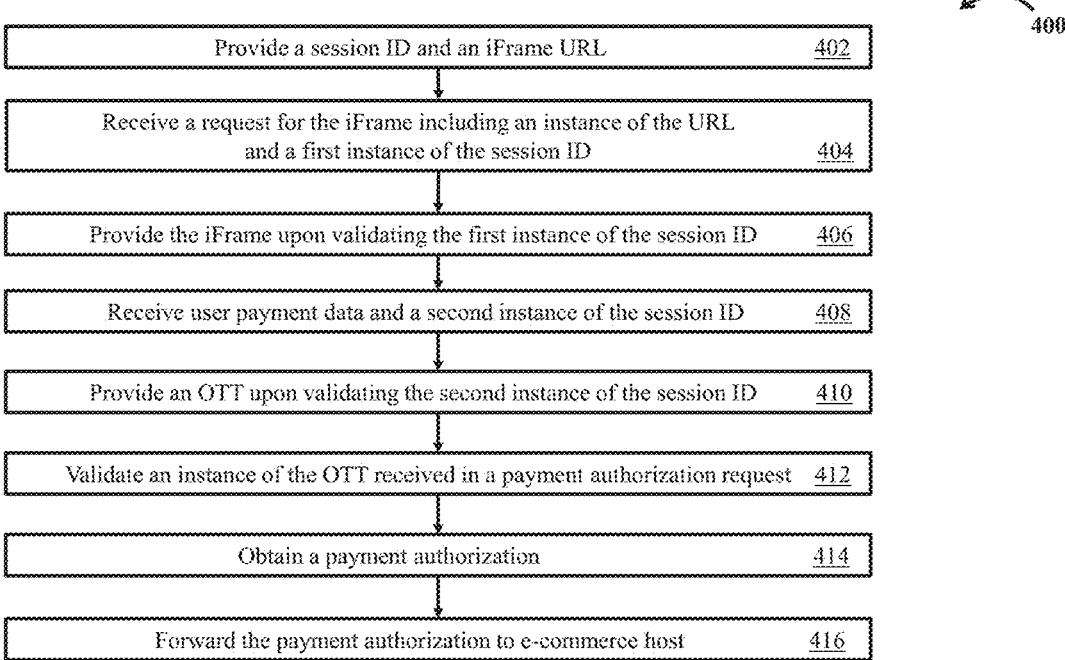

400

| Provide a session ID and an iFrame URL | 402 |

| Receive a request for the iFrame including an instance of the URL and a first instance of the session ID | 404 |

| Provide the iFrame upon validating the first instance of the session ID | 406 |

| Receive user payment data and a second instance of the session ID | 408 |

| Provide an OTT upon validating the second instance of the session ID | 410 |

| Validate an instance of the OTT received in a payment authorization request | 412 |

| Obtain a payment authorization | 414 |

| Forward the payment authorization to e-commerce host | 416 |

FIG. 4

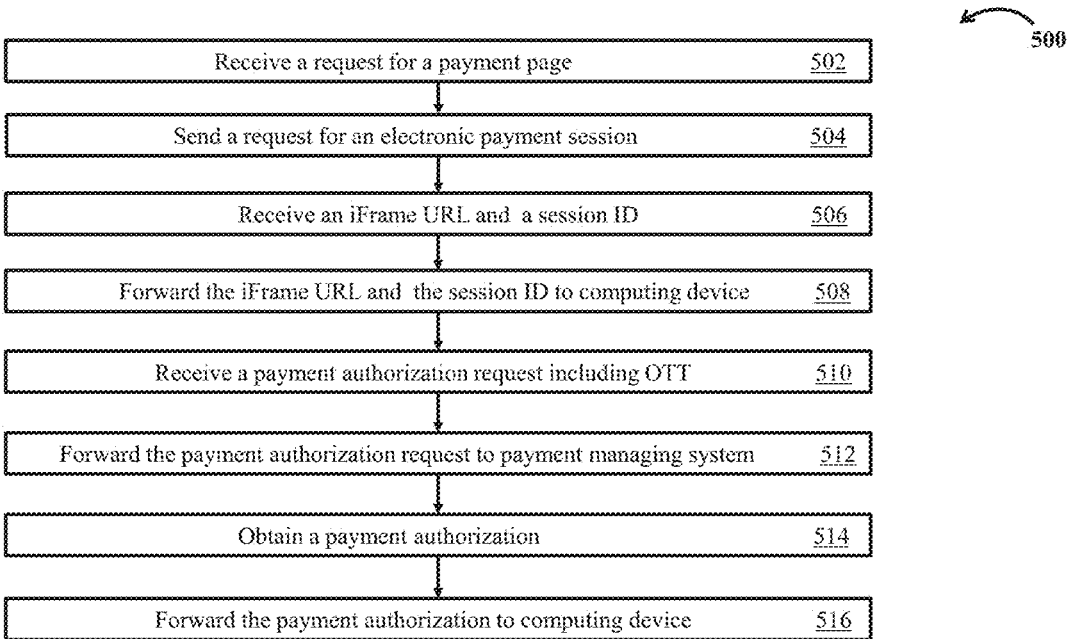

500

| Receive a request for a payment page | 502 |

| Send a request for an electronic payment session | 504 |

| Receive an iFrame URL and a session ID | 506 |

| Forward the iFrame URL and the session ID to computing device | 508 |

| Receive a payment authorization request including OTT | 510 |

| Forward the payment authorization request to payment managing system | 512 |

| Obtain a payment authorization | 514 |

| Forward the payment authorization to computing device | 516 |

FIG. 5

PAYMENT AUTHENTICATION SYSTEM FOR ELECTRONIC COMMERCE TRANSACTIONS

CROSS REFERENCE TO RELATED APPLICATIONS

This application is a continuation application of and claims priority to U.S. application Ser. No. 16/510,593, filed Jul. 12, 2019, and entitled "IMPROVED PAYMENT AUTHENTICATION SYSTEM FOR ELECTRONIC COMMERCE TRANSACTIONS," which is hereby incorporated by reference in its entirety for all purposes.

BACKGROUND

The present disclosure relates generally to processing of secure electronic payment for electronic commerce transactions. Specifically, the present disclosure relates to two-factor authentication of electronic payment for electronic commerce transactions.

SUMMARY

At least one aspect relates to a system for securing electronic payments. The system can include one or more processors and a memory storing computer code instructions. The computer code instructions, when executed by the one or more processors, can cause the system to provide a session identifier (ID) and a URL of an iFrame to an electronic commerce (e-commerce) host server for forwarding to a computing device responsive to the computing device initiating an e-commerce transaction on an information resource. The URL can be associated with the session ID. The system can receive a request for the iFrame from the computing device responsive to the e-commerce host server forwarding the URL and the session ID to the computing device. The request for the iFrame can include a first instance of the session ID. The system can provide, upon validating the first instance of the session ID, the iFrame to the computing device for display thereon. The iFrame can be for decoupling processing of user payment data from the information resource and restricting access to the user payment data to the iFrame. The system can receive user payment data and a second instance of the session ID from the iFrame. The system can provide, upon validating the second instance of the session ID, a one-time token (OTT) to the computing device for use to initiate payment pre-authorization. The OTT can be associated with the session ID. The system can validate, upon receiving a payment pre-authorization request from the e-commerce host server including an instance of the OTT, the instance of the OTT. The system can obtain, upon validating the instance of the OTT, payment pre-authorization from a payment provider system using the user payment data. The system can provide an indication of the payment pre-authorization to the e-commerce host server for forwarding to the computing device. The payment pre-authorization can allow the computing device to finalize the digital transaction.

At least one aspect relates to a method of securing electronic payments. The method can include providing, by a payment managing system, a session identifier (ID) and a URL of an iFrame to an e-commerce host server over a secure communication link for forwarding to a computing device responsive to the computing device initiating an e-commerce transaction on an information resource. The URL can be associated with the session ID. The method can include receiving, by the payment managing system, a request for the iFrame from the computing device responsive to the e-commerce host server forwarding the URL and the session ID to the computing device. The request for the iFrame can include an instance of the URL and a first instance of the session ID. The method can include providing, by the payment ma system, upon validating the first instance of the session ID, the iFrame to the computing device for display thereon. The iFrame can be for decoupling processing of user payment data from the information resource and restricting access to the user payment data to the iFrame. The method can include receiving, by the payment managing system, user payment data and a second instance of the session ID from the iFrame, and providing, by the payment managing system, upon validating the second instance of the session ID, a one-time token (OTT) to the computing device for use to initiate payment pre-authorization. The OTT can be associated with the session ID. The method can include validating, by the payment managing system, upon receiving a payment pre-authorization request from the e-commerce host server including an instance of the OTT, the instance of the OTT. The method can include obtaining, by the payment managing system, upon validating the instance of the OTT, payment pre-authorization from a payment provider system using the user payment data. The method can include providing, by the payment managing system, an indication of the payment pre-authorization to the e-commerce host server for forwarding to the computing device. The payment pre-authorization can allow the computing device to finalize the e-commerce transaction. An iFrame may include any form of inline frame utilized in providing embedded information to a user via an information resource, including but not limited to iFrames utilizing the HTML <iframe> tag.

At least one aspect relates to a non-transitory computer-readable medium including computer code instructions stored thereon. The computer code instructions when execute by one or more processors cause the one or more processors to provide a session identifier (ID) and a URL of an iFrame to an e-commerce host server for forwarding to a computing device responsive to the computing device initiating a e-commerce transaction on an information resource. The URL can be associated with the session ID. The one or more processors can receive a request for the iFrame from the computing device responsive to the e-commerce host server forwarding the URL and the session ID to the computing device. The request for the iFrame can include a first instance of the session ID. The one or more processors can provide, upon validating the first instance of the session ID, the iFrame to the client device for display thereon. The iFrame can be for decoupling processing of user payment data from the information resource and restricting access to the user payment data to the iFrame. The one or more processors can receive user payment data and a second instance of the session ID from the iFrame. The one or more processors can provide, upon validating the second instance of the session ID, a one-time token (OTT) to the computing device for use to initiate payment pre-authorization, the OTT associated with the session ID. The one or more processors can validate, upon receiving a payment pre-authorization request from the e-commerce host server including an instance of the OTT, the instance of the OTT. The one or more processors can obtain, upon validating the instance of the OTT, payment pre-authorization from a payment processor using the user payment data. The one or more processors can provide an indication of the payment pre-authorization to the e-commerce host server for forwarding to the computing device, the payment pre-authorization allowing the computing device to finalize the e-commerce transaction.

BRIEF DESCRIPTION OF THE DRAWINGS

The above and related objects, features, and advantages of the present disclosure will be more fully understood by reference to the following detailed description, when taken in conjunction with the following figures, wherein:

FIGS. 3A and 3B depict example payment pages including respective iFrame user interfaces, according to example embodiments of the current disclosure;

FIG. 4 shows a flowchart depicting an example method performed by a payment managing system, according to example embodiments of the current disclosure;

FIG. 5 shows a flowchart depicting an example method performed by an e-commerce host system, according to example embodiments of the current disclosure.

Like reference numbers and designations in the various drawings indicate like elements.

DETAILED DESCRIPTION

Figure 1:
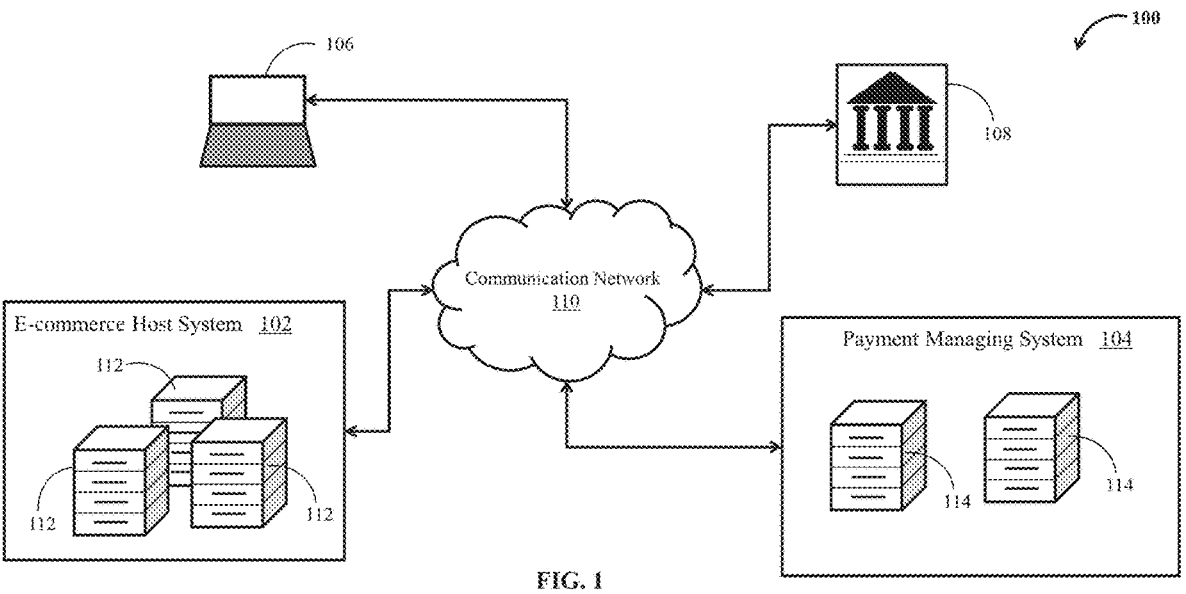
FIG. 1 shows an example computer environment for executing secure electronic payment for electronic commerce transactions, according to example embodiments of the current disclosure.

Following below are more detailed descriptions of various concepts related to, and implementations of, methods, apparatuses, and systems for secure electronic payment involving two-factor authentication in electronic commerce transactions. The various concepts introduced above and discussed in greater detail below may be implemented in any of numerous ways as the described concepts are not limited to any particular manner of implementation. Specific implementations and applications are provided primarily for illustrative purposes.

Electronic commerce (e-commerce) as used herein can encompasses all commercial transactions conducted electronically. The commercial transactions can include any transaction involving a transfer of a monetary value. For instance, a commercial transaction can include transactions involving the sale or purchase of goods, software or services, making a donation, transfer of money between two entities, paying bills or a combination thereof. Electronic payment can include use of sensitive user payment data, such as, credit card information, debit card information, prepaid card information, gift card information, bank account information, other payment information or a combination thereof. A user conducting an e-commerce transaction can provide respective payment data to an electronic system for use to transfer a monetary amount from an account associated with the user to another party, e.g., a merchant, involved in the e-commerce transaction. As used herein, a merchant can refer to a party in a commerce transaction that is selling goods or software or providing services. A merchant can also include, for example, an organization or an entity collecting donations.

User payment data can be subject to theft, for example, by a man in the middle (MITM). A merchant can provide an information resource (e.g., a webpage, a page of a mobile application or a page of another type of application) to prompt a user for respective user payment data. The user payment data may be sent to a remote server, such as a merchant server for processing electronic payment. A MITM attack can include intercepting user payment data transmitted from one electronic system or device, e.g., a user device, to another system or device such as a merchant server, or accessing the user payment data from the merchant server. Upon intercepting user payment data, the MITM can pose as the user and use the user payment data to get access to funds in a corresponding user account, such as a bank account, credit card account, gift card account, prepaid card account, the like or a combination thereof. MITM attacks pose a cybersecurity risk that can erode users' confidence in e-commerce and increase merchant liability.

Inventive concepts described herein allow for avoiding, or at least significantly mitigating, MITM attacks that jeopardize the security and privacy of user payment data. Specifically, systems and methods described herein enhance the security of user payment data at various levels. First, the systems and methods of this disclosure can employ a two-factor authentication when processing electronic payments. The two-factor authentication can include using a first token, e.g., a session ID, and a second token that is a one time token (OTT). The OTT can be designed to expire within a predefined time period. The use of an authentication process involving two tokens, e.g., the session ID and the OTT, with one of the tokens expiring within a relatively short period of time, e.g., few minutes, from the time it is generated or provided to a user device reduces the chances or likelihood of success of a MITM in identifying both tokens before the OTT expires.

Second, the systems and methods described in this disclosure can keep a merchant system (or e-commerce host) out of payment card industry (PCI) scope. Specifically, the systems and methods described in this disclosure employ an iFrame provided by, for example, a PCI data security standard (DSS) validated service provider to prompt input of user input data on a merchant information resource. The PCI DSS validated service provider, or the system thereof, can provide a uniform resource locator (URL) of the iFrame, that is valid for one time use only, to request the iFrame. Every subsequent iFrame request can involve or require generating a new session ID to get a new URL. The iFrame can receive and transmit the user payment data to a system of the service provider without the merchant information resource or the merchant system having access to the user payment data. Instead, the merchant system can receive the OTT for use to request or initiate payment pre-authorization. Associating each iFrame request with a separate session ID and a separate URL prevents, or at least reduces the likelihood of, misuse of an issued session ID. Also, keeping the merchant system out of the PCI scope (or shielding user payment data from the merchant system) reduces the likelihood of undesired access to the user payment data.

Finally, the iFrame can encrypt the user payment data before sending to the PCI DSS validated service provider system (or payment managing system, in general). Also, the payment managing system can provide the iFrame to a user device via a secure communication link. The use of secure connection between the iFrame executing on the client device and the payment managing system and the encryption of the user payment data adds another security layer in terms of protecting the user payment data. In fact, each of the security measures including the two-factor authentication, the relatively short lifetime of the OTT, associating each new iFrame request with a separate session ID and a separate URL, keeping the merchant system outside the PCI scope and encrypting user payment data, adds another layer or level of security, therefore, mitigating the likelihood of successful MITM attacks.

Referring to FIG. 1, an example computer environment 100 for providing secure processing of electronic payment in e-commerce transactions is shown, according to example embodiments of the current disclosure. The computer environment 100 can include an e-commerce host system 102 (also referred to as ecommerce merchant system), a payment managing system 104, a computing device 106 and a payment provider system 108. The payment managing system 104 can be communicatively coupled to the e-commerce host system 102, the computing device 106 and the payment provider system 108 through a communications network 110. The communication network 110 can include the Internet, an intranet, a telephone network, such as the Public Switched Telephone Network (PSTN), a cellular network, an optical communication network, a local area network (LAN), a wide area network (WAN), a wireless link, or a combinations thereof. Also, the e-commerce host system 102 can be communicatively coupled to the computing device 106 via the communication network 110.

The e-commerce host system 102 can be a computer system including one or more hardware computer servers 112. The e-commerce host system 102 can be associated with an e-commerce merchant who is, for example, offering goods, software, data or services online, or collecting donations online. The e-commerce host system 102, or the respective server(s) 112, can provide a website or an application (e.g., a mobile application or other type of software application) executable on the computing device 106. The website or application can include one or more information resources (e.g., webpage(s) or application pages) for displaying content related to, for example, goods, software or services offered by the e-commerce merchant or donations sought by the e-commerce merchant. The one or more information resources can include a checkout information resource (e.g., webpage or application page) for finalizing an e-commerce transaction once a user of the computing device 106 decides to make the transaction with the e-commerce merchant. For instance, once the user selects an item to purchase, the user may actuate (e.g., click or tap on) a button or interactive icon of a given information resource to load or display the checkout information resource. The checkout information resource can allow the user to make an electronic payment and finalize the e-commerce transaction.

The one or more servers 112 can provide computing devices, such as computing device 106, access to the website or application of the e-commerce merchant. For instance, the server(s) 112 can include a web server or an application server that can allow the computing device 106 to download an instance of the website or application of the e-commerce merchant. The server(s) 112 can be configured to, e.g., can include executable instructions which when executed cause the server(s) 112 to, communicate with the payment managing system 104 and the computing device 106, for example, to execute e-commerce transactions.

The computing device 106 can include a user (or client) device, such as a desktop, a laptop, a mobile device, a tablet, or other electronic device associated with individual users capable of executing software instructions. The computing device 106 can include other devices accessible to individual users, such as an electronic kiosk, among others. The computing device 106 can include load, and execute instructions associated with, the website or application of the e-commerce merchant. The computing device 106 can communicate with the e-commerce host system 102 and the payment management system 104 via the communication network 110, for example, to execute e-commerce transactions.

The payment provider system 108 can include a computer or electronic system associated with a payment provider, such as a bank or a credit card issuer, among others. The payment provider can manage monetary accounts (e.g., bank accounts, credit card accounts, gift card accounts, prepaid card accounts, among others) for various individuals or entities, and can make payments on behalf of such individuals or entities. The payment provider system 108, or computer servers thereof, can electronically execute a payment on behalf of a given individual or entity upon receiving user payment data (e.g., information identifying the account of an individual or entity) and a payment amount. The receipt of the user payment data and the payment amount can be indicative of a payment authorization by the respective user or entity. The user can be an individual acting on his own behalf or on behalf of another entity (e.g., an organization, a trust, or business entity). Electronic execution of a payment can include transferring payment amount from an account of the individual or entity initiating the e-commerce transaction to another account of the e-commerce merchant. Both accounts can be associated with a single payment provider or distinct payment providers.

The payment managing system 104, e.g., a PCI DSS validated service provider system, can be configured to manage or handle payment processes, including exchange of user payment data between the computing device 106 and the payment provider system 108, in a secure manner. Such payment processes can also include communicating or exchanging data with the e-commerce host system 102 since the respective e-commerce merchant is a party in the e-commerce transaction. In fact, the payment managing system 104 can be viewed as acting on behalf of the e-commerce merchant. The details of the communications and processing steps associated with a payment process are discussed in further detail below with regard to FIG. 2. While FIG. 1 shows a single e-commerce host system 102, in general, the payment managing system 104 can serve a plurality of e-commerce host systems 102. Also, the payment managing system 104 can be communicatively coupled to a plurality of computing devices 106 and a plurality of payment provider systems 108.

The payment managing system 104 can include one or more hardware computer servers 114 configured to manage or handle electronic payment processes. The hardware computer server(s) 114 can include software instructions, which when executed by one or more processors of the hardware computer servers 114, cause the hardware computer server(s) 114 to perform processes described in further detail with respect to FIG. 2 below. The hardware computer server(s) 114 can include a payment gateway and an e-commerce standard template (ECST) server (not shown in FIG. 1). The payment managing system 104 can include a plurality of payment gateways and/or a plurality of e-commerce ECST servers. Each of the payment gateway(s) and the ECST server(s) can be implemented as a hardware server, a virtual server, a software server or combination thereof. The payment gateway(s) can be configured to communicate with the e-commerce host system 102 while the ECST server(s)

can be configured to communicate with computing devices 106 as discussed in further detail below with respect to FIG. 2.

Figure 2:
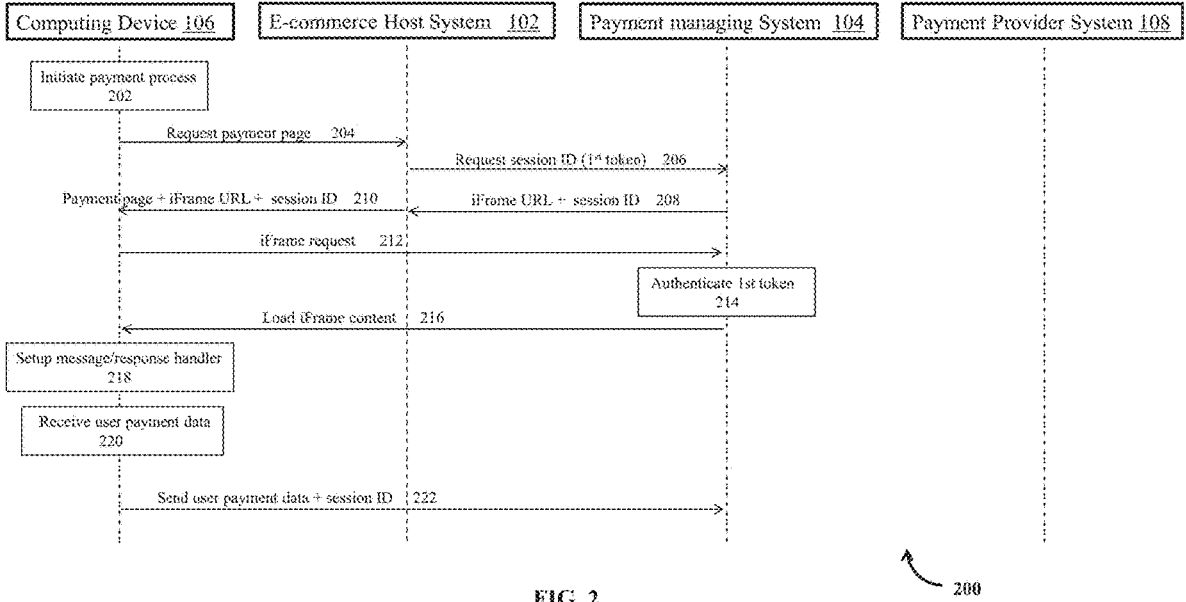
FIG. 2 shows a flow diagram of an example method for executing secure electronic payment for electronic commerce transactions, according to example embodiments of the current disclosure.

Referring to FIG. 2, a signaling and processing flowchart depicting an example electronic payment method 200 is shown, according to example embodiments of the current disclosure. The signaling and processing flowchart depicts communication and processing steps performed by the systems and/or devices of the computer environment 100 of FIG. 1. The method 200 can be viewed as a combination of methods or processes, each of which performed by a respective entity among the entities in the computer environment 100.

The method 200 can include the computing device 106 initiating an electronic payment process (step 202). For instance, upon selecting one or more purchase items (e.g., good(s), software, data item(s), donation(s), service(s)) on the website or application of the e-commerce host, a user of the computing device 106 can actuate a checkout button or icon to request a checkout or payment information resource (also referred to as checkout or payment page). Actuating the checkout button or icon can cause the computing device 106 to send a payment page request to the e-commerce host system 102 (step 204). For instance, the checkout button or icon can be associated with a uniform resource identifier (URI) of a server 112 of the e-commerce host system 102 hosting the payment or checkout page. The website or application of the e-commerce host system 102 can include software instructions that are executed upon a user actuating the checkout button or icon to cause the computing device to send the request for the payment page to the server 112 identified by the URI.

The method 200 can include the e-commerce host system 102 sending a request for a session identifier (ID) to the payment managing system 104 (step 206), responsive to receiving the payment page request from the computing device 106. The request for the session ID can be viewed as request to the payment managing system 104, or the respective payment gateway, to initiate an electronic payment session. Responsive to the request for session ID (or request for electronic payment session initiation) received from the e-commerce host system 102, the payment gateway (or server 114) can initiate an electronic payment session, for example, by generating a session ID identifying the electronic payment session. The session ID can be a random number or random string generated responsive to request for session ID. As described in further detail below, the session ID can be viewed as a first token for use by the payment managing system 104, or respective servers 114, to authenticate requests from the computing device 106 or the e-commerce host system 102.

The server 114 can generate, responsive to the received request for session ID, a uniform resource locator (URL) of an iFrame. For instance, the payment gateway can request, responsive to the received request for session ID, a uniform resource locator (URL) of an iFrame from the ECST server, and the ECST server can generate and send the iFrame URL to the payment gateway. The iFrame can be a document provided by the ECST server to be embedded in the payment page (or payment information resource) of the e-commerce host system 102. The iFrame and the payment page can be in different domains. While the payment page can be hosted or provided by the e-commerce host system 102 or a respective server 112, the iFrame can be hosted or provided by the payment managing system 104 or a respective server 114 (e.g., ECST server). The iFrame URL can be a dynamic URL specific to the initiated electronic payment session for use to request the iFrame from the ECST server (or server 114). Specifically, the ECST server (or server 114) can generate a different iFrame URL for each newly initiated payment session, and each iFrame URL can be valid for a single payment session identified by a respective session ID. The iFrame can be for a single use. For instance, the ECST server (or server 114) can allow a single request for the iFrame per iFrame URL. After being used once to request the iFrame, an iFrame URL can expire, and the ECST server (or server 114) will ignore, or generate an error message responsive to, any subsequent request for the iFrame using the previously used (or expired) iFrame URL. The ECST server (or server 114) can maintain, in a memory, a data structure associating (or linking) the iFrame URL, generated responsive to the request for the payment session, with the session ID of the payment session. The data structure can include a table, a linked list or the iFrame URL appended with the session ID, among others. An example dynamic iFrame URL can be: https:/SEVER.DOMAIN-NAME.com/ DIRECTORY/querystring?a=09b71277

The method 200 can include the payment gateway (or server 114) sending the iFrame URL and the session ID to the e-commerce host system 102, responsive to the request for payment session initiation (step 208). For instance, the payment gateway (or server 114) can append the iFrame URL with the session ID and send the appended URL to the e-commerce host system 102. The payment gateway (or server 114) can send the iFrame URL and the session ID as two separate data items (or pieces of data) to the e-commerce host system 102. The payment gateway (or server 114) can send the iFrame URL and the session ID to the e-commerce host system 102 via a secure communication link. For instance, the payment gateway (or server 114) can establish a secure communication link with a server 112, and send the iFrame URL and the session ID to the server 112 via the established secure communication link. In a secure connection (or secure link), data can be encrypted using a security protocol before being sent on secure link. For instance, the payment gateway (or server 114) can encrypt the session ID and/or the iFrame URL before sending to the e-commerce hots system 102.

Upon receiving the iFrame URL and the session ID from the payment managing system 104, the e-commerce host system 102 or a respective server 112 can send the payment page together with the iFrame URL and the session ID to the computing device 106 (step 210). The server 112 can decrypt the session ID and/or the iFrame URL if received in encrypted form. The server 112 can embed the iFrame URL and/or the session ID into the payment page. For instance, the server 112 can embed a version of the iFrame URL appended with the session ID into the payment page. The server 112 can send the modified payment page (with the iFrame URL and/or the session ID embedded therein) to the computing device 106. The server 112 can send the iFrame URL and/or the session ID separate from the payment page, in which case the computing device 106 can store or maintain the iFrame URL and/or the session ID, for example, in a memory cache associated with the merchant website or application.

The method 200 can include the computing device 106 sending a request for the iFrame to the ECST server or the payment managing system 102 upon receiving the payment page, the session ID and the iFrame URL (step 212). The payment page can include executable instructions, which when executed by the computing device 106 can cause the computing device 106 to send the request for the iFrame to the ECST server or the payment managing system 102. The executable instructions can be configured to execute upon uploading (or during uploading of) the payment page on the computing device 106. The request for the iFrame can include the session ID and the iFrame URL. For instance, the request for the iFrame can include the iFrame URL appended with the session ID. The computing device 106 can send the request for the iFrame over a secure communication link between the computing device 106 and the ECST server (or the payment managing system 102).

The method 200 can include the ECST server (or server 114) authenticating or validating the session ID (or session ID instance) in the request for the iFrame received (step 214). The ECST server (or server 114) can extract the instance of the session ID from the request for the iFrame and compare the instance of the session ID to one or more session IDs, corresponding to one or more payment sessions, maintained by the ECST server (or server 114). Note that the ECST server (or server 114 or payment managing system 104) can receive iFrame requests (e.g., for various payment sessions) from a plurality of computing devices 106 within a given time period. Each iFrame request can include a respective iFrame instance and a respective iFrame URL. Accordingly, the ECST server (or server 114) can be configured to determine whether each received request for the iFrame corresponds to an existing electronic payment session or an existing session ID. Authenticating or validating the instance of the session ID received in the request for the iFrame can include the ECST server (or server 114) determining whether there is a match between the received instance of the session ID and one of the session IDs maintained by the payment managing system 104.

The ECST server (or server 114) can determine whether the instance of the session ID and the URL received in the request for the iFrame match a pair of a session ID and an iFrame URL maintained in a data structure by the payment managing system 104. The payment managing system 104 can maintain one or more data structures associating each session ID with a corresponding iFrame URL. The ECST server (or server 114) can also determine whether the URL in the received request for the iFrame expired or not. The URL would expire if it was used in a previously received request for the iFrame. The ECST server (or server 114) can keep track, e.g., in one or more data structures, of which iFrame URLs expired or can delete expired iFrame URLs. The ECST server (or server 114) can declare the instance of the session ID and/or the URL received in the request for the iFrame as valid upon determining that the instance of the session ID and the URL received in the iFrame request match a URL-session ID pair maintained by the payment managing system 102 and that the URL in the iFrame request did not expire.

The method 200 can include the ECST server (or server 114) sending the iFrame to the computing device 106 for loading thereon (step 216), upon validating or authenticating the iFrame request or session ID and/or URL embedded therein. The iFrame can include computer cod instructions, which when executed by the computing device 106 cause the computing device 106 to display a user interface (UI) for prompting the user to enter or input respective payment data. The UI can be displayed within the payment page on the computing device 106. The iFrame can include computer code instructions, which when executed by the computing device 106, cause the computing device 106 to receive payment data input through the UI, and secure the payment data (or at least a portion thereof). Upon receiving the iFrame, the computing device 106 can display the respective iFrame UI.

Figures 3A, 3B:
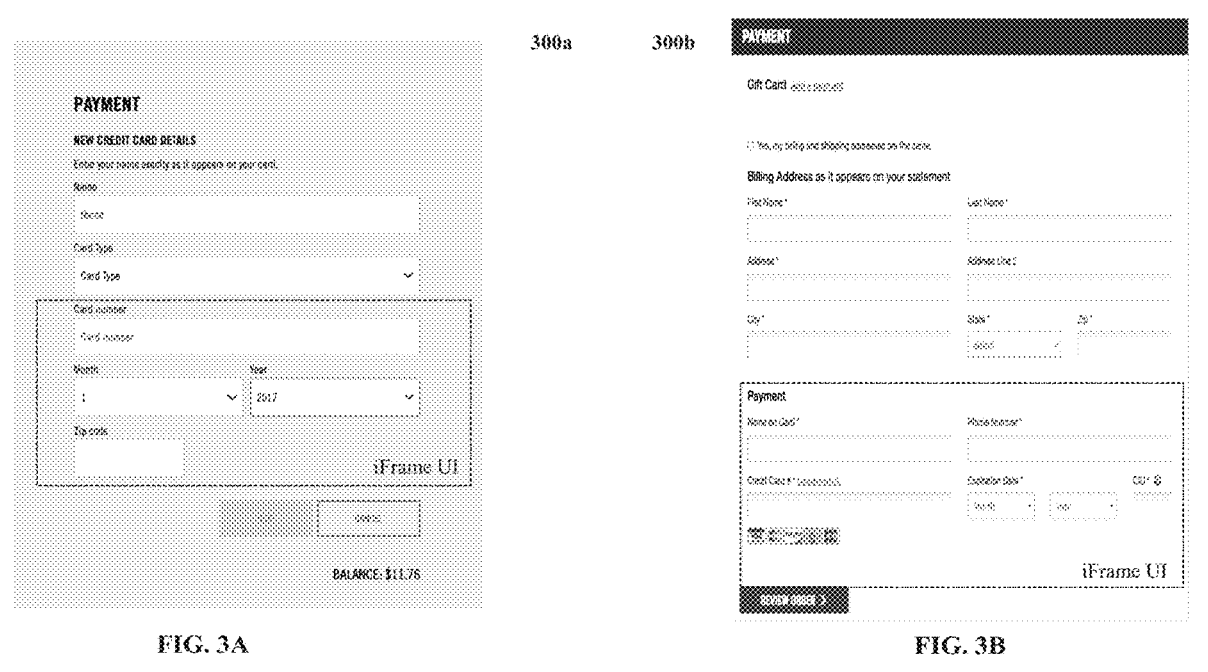

Referring to FIGS. 3A and 3B, example payment pages 300a and 300b with respective iFrame UIs 302a and 302b embedded therein are shown, according to example embodiments of the current disclosure. The iframe UIs 302a and 302b are displayed within the payment pages 300a and 300b, respectively. The iFrame UI 302a can include input fields for entering a credit card number, an expiration month and expiration year of the credit card, and a billing zip code associated with the credit card. The iFrame UI 302b can include input fields for entering a user name as it appears on a credit card, a user phone number, a credit card number, an expiration month and expiration year of the credit card, and a security code of the credit card. The payment pages 300a and 300b and the iFrame UIs 302a and 302b represent illustrative examples and are not to be interpreted as limiting. For example, the iFrame URI 302a or 302b can include other input fields, in addition to or in place of existing input fields, such as fields for entering a bank account number, a routing number, a gift card number, a prepaid card number, a security code, or a combination thereof, among others.

Referring back to FIG. 2, the method 200 can include the computing device 106 linking the iFrame to the payment page (step 218). Specifically, the method 200 can include the computing device 106 setting up a message/response handler to allow for communication between the iFrame and the payment page (or the corresponding parent page). Setting up the message/response handler can include calling or initiating one or more of the functions described below. The iFrame and the payment page can be associated with different domains. The iFrame and/or the payment page can include executable instructions for linking the iFrame to the payment page. For example, the executable instructions can include the method PostMessage( ) and can be used for securely passing messages across domains. Both the payment page and the iFrame can have or include an event listener to listen (or detect) and act on messages communicated between the payment page (or the corresponding parent page) and the iFrame. The PostMessage( ) method and the event listeners can allow for communication to take place between the payment page and the iFrame. The getCardToken( ) function can be used to validate the submitted information, e.g., encrypted user payment data and session ID, (as described in step 224) and after validation return the token from the payment managing system 104 (as described in step 226). The getCardToken function can be initiated or called at the computing device 106 but executed at the payment managing system 104. When initiated, the getCardToken function can return the OTT (step 226) upon successful validation of the session ID (step 224).

The window.parent.postMessage function, used within the reposeHandler( ) function below can securely enable the cross communication between the payment page (or corresponding parent page) and the iFrame. The responseHandler( ) function sends the response to the payment page (or corresponding parent page) from the iFrame.

The method 200 can include the computing device, or the iFrame, receiving user payment data as input via input fields of the iFrame (step 220). The user can enter respective payment data in input fields of the iFrame. As shown in FIGS. 3A and 3B, the user can enter other personal information through other input fields of the payment page. Receiving the user payment data can include receiving actuation of a continue button or icon confirming that the user input data is fully entered. Actuating the continue button or icon can trigger or initiate an event listener.

The iFrame can include executable instructions to cause the computing device to encrypt user payment data received via the iFrame UI. The executable instructions can cause the computing device 106 to encrypt the received user payment data using a Rivest-Shamir-Adleman (RSA) encryption algorithm. The iFrame can include a public key to encrypt the user payment data while a corresponding private key to decrypt the data can be maintained by the payment managing system 104. The payment page and the respective domain (e.g., the e-commerce host system 102 or a respective server 112) may not have access to the user payment data received by the iFrame or to the private key used to decrypt the user payment data.

The method 200 can include the computing device 106 sending the user payment data and the session ID to the payment managing system 104 (step 222). The iFrame or instructions thereof can cause the computing device 106 to send the encrypted user payment data together with the session ID (or a second instance thereof) to the ECST server or server 114. In some implementations, the computing device 106 may not share the user payment data with the e-commerce host system 102. The iFrame can cause the computing device 106 to send the user payment data (e.g., encrypted user payment data) and the session ID over a secure communication link between the computing device 106 and the ECST server (or server 114). The iFrame can cause the computing device 106 to encrypt the session ID and send the encrypted session ID to the ECST server (or server 114).

The method 200 can include the payment managing system 102 authenticating or validating the second instance of the session ID and generating a one time token (OTT), responsive to receiving the user payment data (e.g., encrypted user payment data) and the second instance of the session ID (step 224). Note that the payment managing system 102 can be managing a plurality of payment sessions at a given time point. Accordingly, the ECST server (or server 114) can authenticate the second instance of the session ID to identify the corresponding payment session. For instance, the ECST server can send a request to the payment gateway to validate the session ID and generate the OTT. In response, the payment gateway can compare the second instance of the session ID to one or more session IDs maintained by the payment gateway, for example, and declare the second instance of the session ID as valid if it matches a valid (e.g., not expired) session ID maintained by the payment gateway. The payment gateway can generate the OTT, for example, upon validating the second instance of the session ID, and provide the generated OTT to the ECST server. The OTT can be (or can include) a random number, a random string of characters or a combination thereof. The payment gateway can maintain a data structure (e.g., a table or a linked list among others) to associate the OTT with the corresponding session ID. The OTT can be viewed as a token indicative of, or identifying, the user payment data received from the computing device 106 at step 222. For instance, the payment gateway can maintain a data structure associating the OTT with the user payment data received in step 222. The OTT can be configured to expire after a predefined time period. For example, the predefined time period can be equal to 15 mins, 10 mins or 5 mins, among other time durations. Configuring the OTT to expire after a given time period mitigates the likelihood of misuse of the OTT by a MITM.

The method 200 can include the payment managing system 102 sending the OTT to the computing device, for example, for use to request payment pre-authorization (step 226). The ECST server (or server 114) can send the OTT to the iFrame on the computing device 106, for example, over a secure communication link. The ECST server (or server 114) can encrypt the OTT before sending to the computing device 106. Upon receiving the OTT, the iFrame can pass the OTT to the response handler (step 228). For example, the response handler can be defined by the responseHandler( ) function described above. The response handler can pass or communicate the OTT to the payment page (or the corresponding parent page) for sending to the e-commerce host system 102.

The method 200 can include the computing device 106 sending an order request to the e-commerce host system 102 (step 230). The response handler can cause the computing device 106 to send the order request to server 112. The order request can include the OTT. The order request can include information identifying an item or service ordered by the user of the computing device 106. Upon receiving the order request, the e-commerce host system 102 can send a payment pre-authorization request to the payment managing system 104 (step 232). The payment pre-authorization request can include the OTT. For instance, server 112 can send the payment pre-authorization request to the payment gateway or server 114. The pre-authorization request can include billing information, shipping information, other user information or a combination thereof, among others. The payment managing system 104 or the payment gateway can use billing information, shipping information and/or the other user information for address verification and/or fraud verification.

The method 200 can include the payment managing system 102 validating or authenticating the OTT received in the pre-authorization request (step 234). For instance the payment gateway or server 114 can extract the OTT from the payment pre-authorization request and validate or authenticate OTT. Validating the OTT can include checking whether the received OTT expired or not. The payment gateway can keep track of the which OTTs (e.g., associated with various payment sessions) expired by, for example, recording the time at which each OTT was generated and comparing the elapsed time for each OTT since the time it was generated to the predefined life time of that OTT or maintain a counter for each OTT. Validating the OTT can include checking whether the OTT is associated with a valid session ID using one or more data structures maintained by the payment managing system 102. For instance, the payment gateway or server 114 can determine whether the received OTT is associated with a valid session ID maintained by the payment managing system 104.

If the OTT is determined to be not expired and/or associated with a valid session ID maintained by the payment managing system 104, the payment managing system 104 can send a payment authorization request to the payment provider system 108 (step 236). The payment authorization request sent to the payment provider system 108 can include the user payment data received at step 222. The payment gateway or server 114 can decrypt the encrypted user payment data received from computing device 106 at step 222. The payment gateway or server 114 can encrypt the user payment data with a public key associated with the payment provider system 108 before sending the user payment data to the payment provider system 108. Upon verifying the user payment data, the payment provider system 108 can send a payment authorization response back to the payment gateway or server 114 (step 238). The authorization response can include a confirmation that the payment is authorized.

The method 200 can include the payment gateway or server 114 generating a user payment data ID (step 240), upon receiving the payment authorization response. The user payment ID can be a random number or string of characters indicative of the user payment data received at step 222. The user payment data ID cannot reveal the content of the user payment data outside the payment managing system 102. The payment gateway or server 114 can generate the user payment data ID if the user opts for such option. The user payment data ID can be used to keep record of the user payment data in a secure manner.

The method 200 can include the payment gateway or server 114 providing an indication of the payment authorization to the e-commerce host system 102 or respective server 112 (step 242). The payment gateway or server 114 can also provide the user data ID to the e-commerce host system 102 or respective server 112 for use in a subsequent e-commerce transaction. For instance, in a subsequent e-commerce transaction, the e-commerce host system 102 or respective server 112 can omit requesting a session ID and OTT, and use the user payment ID instead to indicate to the payment managing system 104 the user payment data to be used. The user payment ID can be referred to as card ID, for example, if the user payment data relates to a credit card, debit card, gift card or prepaid card of the user. The e-commerce host system 102 or respective server 114 can store the user payment data ID in user account or electronic wallet (step 244).

The method 200 can include the e-commerce host system 102 forwarding the indication of the payment authorization to the computing device (step 246). Upon receiving confirmation of the payment authorization, the computing device 106 or the respective user can finalize the e-commerce transaction. For instance, responsive to receiving the confirmation of the payment authorization, the computing device can display a next page (e.g., of the e-commerce host website or application). The next page can be a confirmation page confirming execution of the e-commerce transaction. When a user enters the respective user payment data in the iFrame UI and hits Submit/Place Order, which can be considered as a confirmation, the website or application associated with the e-commerce host system 102 can display the response on confirmation page along with the order or cart details.

Referring to FIG. 4, a flowchart depicting an example method 400 performed by a payment managing system, such as payment managing system 104 of FIG. 1, is shown, according to example embodiments of the current disclosure. The method 400 can include providing a session identifier (ID) and a URL of an iFrame to an e-commerce host server (step 402). The payment managing system can send the URL and the session ID over a secure communication link. The e-commerce host server can forward the URL and the session ID to a computing device responsive to the computing device initiating an e-commerce transaction on an information resource. The URL can be associated with the session ID. The method 400 can include receiving a request for the iFrame from the computing device (step 404). The request for the iFrame can be responsive to the e-commerce host server forwarding the URL and the session ID to the computing device. The request for the iFrame can include an instance of the URL and a first instance of the session ID.

The method 400 can include providing, upon validating the first instance of the session ID, the iFrame to the computing device for display thereon (step 406). The iFrame can be for decoupling processing of user payment data from the information resource and restricting access to the user payment data to the iFrame. The method 400 can include receiving user payment data and a second instance of the session ID from the iFrame (step 408). The method 400 can include providing, upon validating the second instance of the session ID, a one-time token (OTT) to the computing device for use to initiate payment pre-authorization (step 410). The OTT can be associated with the session ID. The method 400 can include validating, upon receiving a payment pre-authorization (or payment authorization) request from the e-commerce host server including an instance of the OTT, the instance of the OTT (step 412). The method 400 can include obtaining, upon validating the instance of the OTT, payment pre-authorization (or payment authorization) from a payment provider system using the user payment data (step 414). The method 400 can include providing an indication of the payment pre-authorization to the e-commerce host server for forwarding to the computing device (step 416). The payment pre-authorization can allow the computing device to finalize the e-commerce transaction. The payment managing system 104 can perform the method 400 as described above with regard to FIG. 2.

Referring to FIG. 5, a flowchart depicting an example method 500 performed by an e-commerce host system, such as e-commerce host system 102 of FIG. 1, is shown, according to example embodiments of the current disclosure. The method 500 can include receiving a request for a payment page from a computing device (step 502) for executing an e-commerce transaction. The method 500 can include sending a request for an electronic payment session to a payment managing system, responsive to receiving the request for the payment page from the computing device (step 504). The method 500 can include receiving an iFrame URL and a session ID from the payment managing system over a secure communication link, responsive to the request for the electronic payment session (step 506), and forwarding the URL and the session ID to the computing device (step 508). The method 500 can include receiving, from the computing device, a payment pre-authorization request including an instance of a one-time-token (OTT) (step 510). The payment managing system can provide the OTT to the computing device, responsive to receipt of an instance of the session ID and user payment data. The method 500 can include forwarding the payment pre-authorization request to the payment managing system (step 512), and receiving a payment authorization response, in response to the payment pre-authorization request (step 514). The method 500 can include forwarding the payment authorization response to the computing device (step 516) to finalize the e-commerce transaction. The e-commerce host system 102 can perform the method 500 as described above with regard to FIG. 2.

The methods 200, 400 and 500 can be performed using computer code instructions, which when executed by one or more processors cause the one or more processors to perform any of the methods 200, 400 or 500 or processes associated with each of the systems of the computer environment 100. The computer code instructions can be stored in a non-transitory computer-readable medium, such as a storage device or memory.

Figure 6:
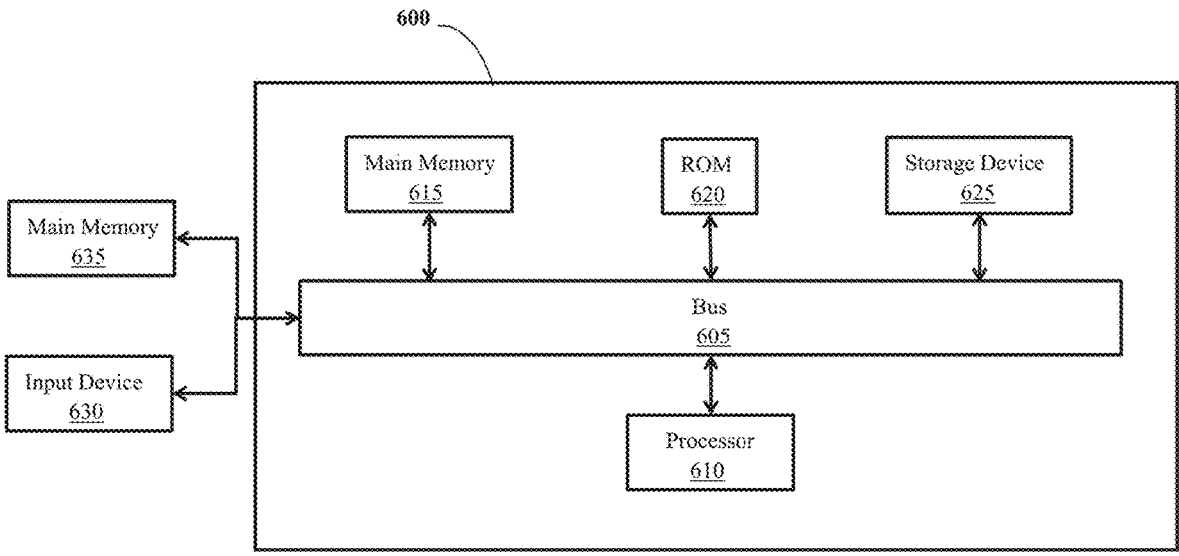
FIG. 6 is a block diagram of a computer system that can be used to implement one or more components of the computer environment of FIG. 1.

FIG. 6 is a block diagram of a computer system 600 that can be used to implement the e-commerce host system 102 or respective servers 112, the payment managing system 104 or respective servers 114, the computing device 106, the payment provider system 108 or components thereof, and other components described herein. The computing system 600 can include a bus 605 or other communication component for communicating information and a processor 610 coupled to the bus 605 for processing information. The computing system 600 can also include one or more processors 610 coupled to the bus for processing information. The computing system 600 also can include main memory 615, such as a RAM or other dynamic storage device, coupled to the bus 605 for storing information, and instructions to be executed by the processor 610. Main memory 615 can also be used for storing temporary variables or other intermediate information (e.g., session ID, OTT, or user payment data) during execution of instructions by the processor 610. The computing system 600 may further include a ROM 620 or other static storage device coupled to the bus 605 for storing static information and instructions for the processor 610. A storage device 625, such as a solid state device, magnetic disk or optical disk, can be coupled to the bus 605 for persistently storing information and instructions. Computing device 600 may include, but is not limited to, digital computers, such as laptops, desktops, workstations, personal digital assistants, servers, blade servers, mainframes, cellular telephones, smart phones, mobile computing devices (e.g., a notepad, e-reader, etc.) etc.

The computing system 600 may be coupled via the bus 605 to a display 635, such as a Liquid Crystal Display (LCD), Thin-Film-Transistor LCD (TFT), an Organic Light Emitting Diode (OLED) display, LED display, Electronic Paper display, Plasma Display Panel (PDP), or other display, etc., for displaying information to a user. An input device 630, such as a keyboard including alphanumeric and other keys, may be coupled to the bus 605 for communicating information and command selections to the processor 610. In another implementation, the input device 630 may be integrated with the display 635, such as in a touch screen display. The input device 630 can include a cursor control, such as a mouse, a trackball, or cursor direction keys, for communicating direction information and command selections to the processor 610 and for controlling cursor movement on the display 635.

According to various implementations, the processes or methods described herein can be implemented by the computing system 600 in response to the processor 610 executing an arrangement of instructions contained in main memory 615. Such instructions can be read into main memory 615 from another computer-readable medium, such as the storage device 625. Execution of the arrangement of instructions contained in main memory 615 causes the computing system 600 to perform the illustrative processes described herein. One or more processors in a multi-processing arrangement may also be employed to execute the instructions contained in main memory 615. In alternative implementations, hard-wired circuitry may be used in place of or in combination with software instructions to effect illustrative implementations. Thus, implementations are not limited to any specific combination of hardware circuitry and software.

Although an implementation of a computing system 600 has been described in FIG. 6, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. The subject matter described in this specification can be implemented as one or more computer programs, e.g., one or more modules of computer program instructions, encoded on one or more computer storage media for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be performed by a data processing apparatus on data stored on one or more computer-readable storage devices or received from other sources.

The terms "data processing apparatus," "computing device," or "processing circuit" encompass all kinds of apparatus, devices, and machines for processing data, including by way of example a programmable processor, a computer, a system on a chip, or multiple ones, a portion of a programmed processor, or combinations of the foregoing. The apparatus can include special purpose logic circuitry, e.g., an FPGA or an ASIC. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single software product or packaged into multiple software products embodied on tangible media.

References to "or" may be construed as inclusive so that any terms described using "or" may indicate any of a single, more than one, and all of the described terms.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The claims should not be read as limited to the described order or elements unless stated to that effect. It should be understood that various changes in form and detail may be made without departing from the spirit and scope of the appended claims. All implementations that come within the spirit and scope of the following claims and equivalents thereto are claimed.

What is claimed is:

1. A system for securing electronic payments, the system comprising:

one or more processors; and a memory storing computer code instructions, the computer code instructions, when executed by the one or more processors, cause the system to:

provide a session identifier (ID) and a URL of an iFrame to an electronic commerce (e-commerce) host server for forwarding to a computing device responsive to the computing device initiating an e-commerce transaction on an information resource, the URL associated with the session ID;

provide, upon validating a first instance of the session ID, the iFrame to the computing device for display thereon, the iFrame for decoupling processing of user payment data from the information resource and restricting access to the user payment data to the iFrame via executable instructions which cause the computing device to identify, via a user interface of the iFrame, a first selected information comprising one of a billing information, a shipping information or a zip code;

receive, from the e-commerce host server, a second selected information comprising a second one of the billing information, the shipping information or the zip code;

store, in association with the session ID and the URL, the first selected information and the second selected information;

receive user payment data and a second instance of the session ID from the iFrame;

provide, upon validating the second instance of the session ID, a one-time token (OTT) to the computing device for use to initiate payment pre-authorization, the OTT associated with the session ID;

verify consistency of selected data associated with the session ID based on the first selected information and the second selected information;

validate, upon receiving a payment pre-authorization request from the e-commerce host server including an instance of the OTT and responsive to the verified consistency of the selected data, the instance of the OTT;

obtain, upon validating the instance of the OTT, payment pre-authorization from a payment provider system using the user payment data; and provide an indication of the payment pre-authorization to the e-commerce host server for forwarding to the computing device, the payment pre-authorization allowing the computing device to finalize the e-commerce transaction.

2. The system of claim 1, wherein the computer code instructions, when executed by the one or more processors, further cause the system to: receive a request for the iFrame from the computing device, wherein the request includes an instance of the URL appended with the first instance of the session ID.

3. The system of claim 1, wherein the computer code instructions, when executed by the one or more processors, further cause the system to:

validate the first instance of the session ID by determining that the first instance of the session ID is equal to the session ID associated with the URL.

4. The system of claim 1, wherein the iFrame includes software instructions, which when executed by the computing device cause the computing device to:

display a user interface to prompt input of the user payment data;

encrypt the user input data when input via the user interface; and send the encrypted user input data to the system.

5. The system of claim 1, wherein the computer code instructions, when executed by the one or more processors, cause the system to provide the session ID and the URL of the iFrame to the e-commerce host server via a secure communication link between the system and the e-commerce host server.

6. The system of claim 1, wherein the computer code instructions, when executed by the one or more processors, further cause the system to generate the OTT.

7. The system of claim 1, wherein the computer code instructions, when executed by the one or more processors, further cause the system to verify consistency of the selected data by comparing geographical data associated with the first selected information with geographical data associated with the second selected information.

8. The system of claim 1, wherein in validating the instance of the OTT the computer code instructions, when executed by the one or more processors, cause the system to:

check that the instance of the OTT matches the OTT in a data structure that associates the OTT with the session ID, and that the OTT in the data structure did not expire;

check that the session ID in the data structure is valid; and determine validity of the OTT upon determining that the OTT in the data structure did not expire and that the session ID in the data structure is valid.

9. The system of claim 1, wherein at least one of the billing information, the shipping information, or the zip code corresponds to a geographic location associated with the user.

10. The system of claim 1, wherein the computer code instructions when executed by the one or more processors further cause the system to identify a geographic location associated with the user based on at least one of the billing information, the shipping information, or the zip code.

11. The system of claim 10, wherein the computer code instructions when executed by the one or more processors further cause the system to verify the consistency of the selected data according to the identified geographic location.

12. The system of claim 1, wherein the computer code instructions when executed by the one or more processors further cause the system to identify, based on at least one of the billing information, the shipping information or the zip code, a geographic location from which the user is accessing the system.

13. A method comprising:

providing, by a digital payment processing system, a session identifier (ID) and a URL of an iFrame to an e-commerce host server over a secure communication link for forwarding to a computing device responsive to the computing device initiating an e-commerce transaction on an information resource, the URL associated with the session ID;

providing, by the digital payment processing system, upon validating a first instance of the session ID, the iFrame to the computing device for display thereon, the iFrame for decoupling processing of user payment data from the information resource and restricting access to the user payment data to the iFrame via executable instructions which cause the computing device to identify, via a user interface of the iFrame, a first selected information comprising one of a billing information, a shipping information or a zip code;

receiving, by the digital processing system, from the e-commerce host server, a second selected information comprising a second one of the billing information, the shipping information or the zip code;

storing, by the digital processing system, in association with the session ID and the URL, the first selected information and the second selected information;

receiving, by the digital payment processing system, user payment data and a second instance of the session ID from the iFrame;

providing, by the digital payment processing system, upon validating the second instance of the session ID, a one-time token (OTT) to the computing device for use to initiate payment pre-authorization, the OTT associated with the session ID;

verifying, by the digital processing system, consistency of selected data associated with the session ID based on the first selected information and the second selected information;

validating, by the digital payment processing system, upon receiving a payment pre-authorization request from the e-commerce host server including an instance of the OTT and responsive to the verified consistency of the selected data, the instance of the OTT;

obtaining, by the digital payment processing system, upon validating the instance of the OTT, payment pre-authorization from a payment provider system using the user payment data; and providing, by the digital payment processing system, an indication of the payment pre-authorization to the e-commerce host server for forwarding to the computing device, the payment pre-authorization allowing the computing device to finalize the e-commerce transaction.

14. The method of claim 13, wherein the URL is valid for a single payment session identified by the session ID.

15. The method of claim 13, wherein the iFrame includes software instructions, which when executed by the computing device cause the computing device to:

display a user interface to prompt input of the user payment data;

encrypt the user input data when input via the user interface; and send the encrypted user input data to the system.

16. The method of claim 13, wherein the OTT expires after a predefined time period.

17. The method of claim 13, further comprising:

verifying, by the digital payment processing system, consistency of the selected data by comparing geographical data associated with the first selected information with geographical data associated with the second selected information.

18. The method of claim 13, further comprising maintaining a data structure associating the OTT with the session ID.

19. The method of claim 18, wherein validating the instance of the OTT the computer code instructions includes:

checking that the instance of the OTT matches the OTT in the data structure and that the OTT in the data structure did not expire;

checking that the session ID in the data structure is valid; and determining validity of the OTT upon determining that the OTT in the data structure did not expire and that the session ID in the data structure is valid.

20. A non-transitory computer-readable medium including computer code instructions stored thereon, the computer code instructions when execute by one or more processors cause the one or more processors to:

provide a session identifier (ID) and a URL of an iFrame to a e-commerce host server for forwarding to a computing device responsive to the computing device initiating a e-commerce transaction on an information resource, the URL associated with the session ID;

provide, upon validating a first instance of the session ID, the iFrame to a client device for display thereon, the iFrame for decoupling processing of user payment data from the information resource and restricting access to the user payment data to the iFrame via executable instructions which cause the computing device to identify, via a user interface of the iFrame, a first selected information comprising one of a billing information, a shipping information or a zip code;

receive, from the e-commerce host server, a second selected information comprising a second one of the billing information, the shipping information or the zip code;

store, in association with the session ID and the URL, the first selected information and the second selected information;

receive user payment data and a second instance of the session ID from the iFrame;

provide, upon validating the second instance of the session ID, a one-time token (OTT) to the computing device for use to initiate payment pre-authorization, the OTT associated with the session ID;

verify consistency of selected data associated with the session ID based on the first selected information and the second selected information;

validate, upon receiving a payment pre-authorization request from the e-commerce host server including an instance of the OTT and responsive to the verified consistency of the selected data, the instance of the OTT;

obtain, upon validating the instance of the OTT, payment pre-authorization from a payment processor using the user payment data; and provide an indication of the payment pre-authorization to the e-commerce host server for forwarding to the computing device, the payment pre-authorization allowing the computing device to finalize the e-commerce transaction.

* * * * *